Dec. 22, 1959 D. E. WIEGAND 2,918,535

MAGNETIC PICK-UP HEAD

Filed Aug. 16, 1955 3 Sheets-Sheet 1

Inventor
DAVID E. WIEGAND by Hill, Sherman, Meroni, Gross & Simpson Attys.

Dec. 22, 1959 D. E. WIEGAND 2,918,535

MAGNETIC PICK-UP HEAD

Filed Aug. 16, 1955 3 Sheets-Sheet 2

Inventor
David E. Wiegand by Hill, Sherman, Meroni, Gross & Simpson Attys.

Dec. 22, 1959 D. E. WIEGAND 2,918,535

MAGNETIC PICK-UP HEAD

Filed Aug. 16, 1955 3 Sheets-Sheet 3

Inventor
DAVID E. WIEGAND
by Hill, Sherman, Meroni, Gross & Simpson
Attys.

United States Patent Office 2,918,535

Patented Dec. 22, 1959

2,918,535

MAGNETIC PICK-UP HEAD

David E. Wiegand, Villa Park, Ill., assignor to Armour Research Foundation of Illinois Institute of Technology, Chicago, Ill., a corporation of Illinois Application August 16, 1955, Serial No. 528,697

7 Claims. (Cl. 179—100.2)

This invention relates to a magnetic playback head and method of reproducing magnetically recorded signals, and more particularly to such a method and means operating in response to the internal magnetization of the record medium rather than in response to the external leakage flux.

It is an important object of the present invention to provide a novel method and means for reproducing magnetically recorded signals.

It is a further important object of the present invention to provide such a method and means which is responsive to the internal magnetization of the record member rather than to the external leakage flux.

A still further object of the present invention is to provide a novel playback head and method responding to infinitely long recorded wavelengths.

Other objects, features and advantages of the present invention will be more fully apparent from the following detailed description taken in conjunction with the accompanying drawings, in which.

As shown on the drawings.

The head of the present invention is believed to operate by sensing variations in the incremental permeability of a magnetic record medium due to variations in the strength of the recorded signal within the magnetic record medium. In accordance with this invention, the magnetic material of the record medium is excited by means of a high frequency excitation winding, and a pick-up winding is arranged in such a manner that the incremental permeability of the record medium governs the coupling between the exciting and pick-up windings and thus causes the induced voltage in the pick-up winding to vary with the recorded signal.

Figure 1:
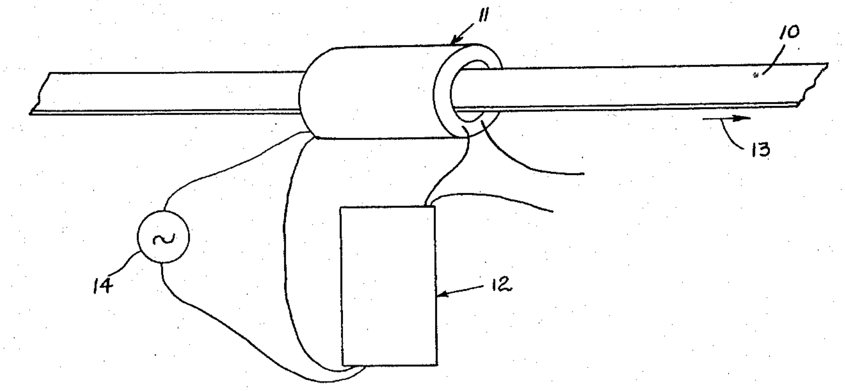
Figure 1 is a diagrammatic view of a magnetic playback head constituting a first embodiment of the present invention.
Figure 2:
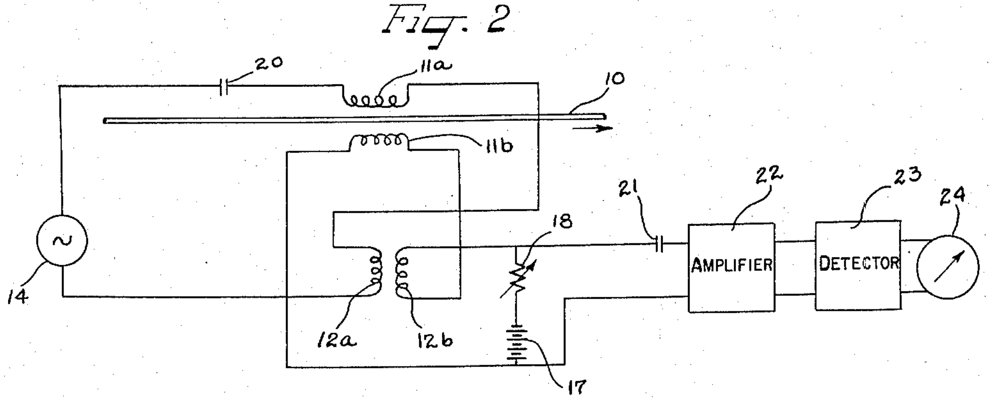
Figure 2 is a circuit diagram for the head of Figure 1.

In Figures 1 and 2, a magnetized record medium 10, is passed through coil means 11 which includes an exciting winding 11*a* and a pick-up winding 11*b*, for example in the direction of the arrow 13 in Figure 1. The winding 11*a* may be energized by a source 14 to apply a high frequency fluctuating magnetomotive force to the record medium, for example at a frequency of 228 kilocycles per second. For balancing out at least a portion of the fundamental component in the pick-up circuit, the winding 11*a* may be in series with a winding 12*a* of coil means 12 in the oscillator circuit, while the winding 11*b* may be connected in series with a winding 12*b*. The fundamental frequency voltage induced in pick-up winding 11*b* is thus opposed by the voltage induced in winding 12*b*. A polarizing flux may be provided by means of a battery 17 and resistor 18.

A capacitance 20 may be provided in the oscillator circuit for increasing the power to the coils 11*a* and 12*a*, while a capacitance 21 may be provided in the pick-up circuit to tune the same to the fundamental or second harmonic of the oscillator frequency, for example 228 or 456 kilocycles per second. The fundamental or harmonic may be fed into an amplifier 22 tuned to the desired frequency and then to a detector 23 such as found in a conventional radio circuit, the detector 23 delivering the output through any suitable amplifier to the output device 24.

Fundamental operation of the head of Figures 1 and 2 is based on the fact that the slope of the B—H characteristic for the material of the record member 10 is greater at low values of recorded flux than at higher values of recorded flux. Thus a given change in the applied magnetomotive force due to the oscillator 14 produces a greater change in induction in the record member at low values of recorded flux than at high values of recorded flux, and the average incremental permeability of the record member for the oscillator excitation frequency is greater at low recorded flux than at high values of recorded flux. For fundamental operation, rather than provide a D.C. bias as indicated in Figure 2, the winding 12*a* may be adjusted so as to balance out only part of the fundamental frequency component induced in the winding 11*b* with zero recorded flux on the record medium 10.

By way of explanation of the second harmonic operation of the head of Figure 2, it may be assumed that as the record medium travels through the coil means 11, the high frequency M.M.F. due to the winding 11*a* causes the induction of the record member to vary along a minor hysteresis loop and that the non-linearity of this minor loop causes a second harmonic component to exist in the induction in the record medium. The degree of this non-linearity varies with the initial recorded magnetization in the energized portion of the record medium. It has been found that the amplitude of the second harmonic voltage component induced in the pickup winding 11*b* will be a function of the residual magnetization of the record medium, so that the output from the detector 23 in Figure 2 will vary in accordance with the magnetization of the record member. By utilizing values of magnetic intensity due to oscillator winding 11*a* which are below the coercive force of the record medium, it has been found that the recorded signal may be reproduced without destroying or altering the recorded signal. On the other hand, with the oscillator M.M.F. at a somewhat higher value, it is found that the record medium can be played back one or more times, but with a successive reduction in the recorded signal on the record member. Second harmonic operation is believed to be based on the fact that the slope of the B—H characteristic for the material of the record member is such as to provide a greater flux change during the positive half cycles of the oscillator excitation than for the negative half cycles of the oscillator excitation. This change in slope for positive and negative excitation currents from the oscillator is greater at low values of recorded flux so as to provide a greater second harmonic output at low values of recorded flux.

Figure 3:
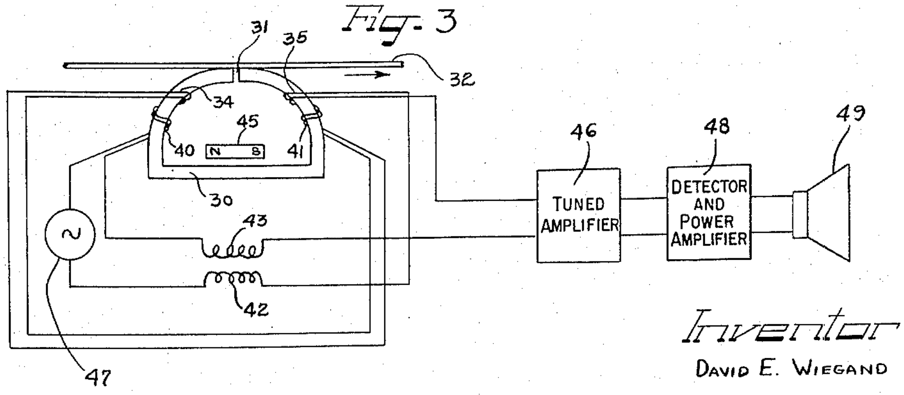
Figure 3 is a schematic illustration of a further embodiment of the present invention.

Figure 3 illustrates a ring type core 30 having a non-magnetic gap 31 for receiving a record medium 32 thereacross. In this embodiment, the core is preferably of relatively large cross section and preferably of a magnetic material having a relatively linear B—H characteristic, such as "Conpernik" having a composition of 50% nickel and the remainder iron and minor constituents, or "Perminvar" having a composition of 25% cobalt, 45% nickel and the remainder iron and minor constituents. Further, in this embodiment, the high frequency windings 34 and 35 are preferably connected in series aiding relation with respect to the gap 31 so as to excite the magnetic material of the record member 32. The high frequency magnetic intensity at the gap 31 is preferably of a small amplitude in comparison with the coercive force of the record member. With such excitation, the magnetic material of the record member operates on a minor hysteresis loop, the incremental permeability of which depends on the residual magnetization of the portion of the record member at the gap 31.

The head thus responds not to the external leakage flux from the record member, but to the actual internal magnetization of the record member. The signal flux acting on the head is thus independent of the recorded wave length of the signal so that a fundamental defect of heads relying on leakage flux from a record member is overcome. Signal pick-up windings 40 and 41 may be bifilar wound with windings 34 and 35 respectively, and also in series siding relation with respect to the gap 31. The oscillator circuit is provided with an inductance 42 and the pick-up circuit is provided with an inductance 43 coupled therewith, so that the coupling between inductances 42 and 43 may be varied to balance out at least a portion of the fundamental component in the pick-up circuit in the absence of a signal flux from the tape 32. Polarizing flux may be introduced by means of a magnet 45. An amplifier 46 has its input connected to the pick-up circuit and is preferably tuned to the oscillator frequency or a harmonic thereof. The output of the tuned amplifier 46 is connected through a conventional amplitude modulation detector and power amplifier unit 48 to an output device 49 such as a loud speaker.

Figure 4:
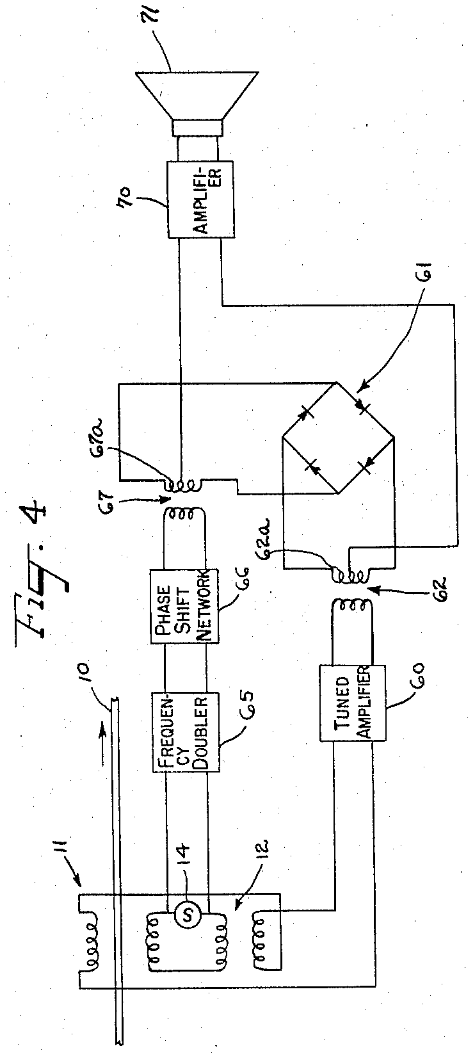
Figure 4 is a diagrammatic view of a head similar to that of Figures 1 and 2 but utilizing an output circuit including a phase demodulator for converting the output from the head into a signal varying in polarity in accordance with the recorded signal.

Figure 4 illustrates a system for demodulating the output from the head of Figures 1 and 2 wherein the output from the head is delivered to an amplifier 60 tuned to the second harmonic of the oscillator 14 and is then coupled to one pair of terminals of a rectifier circuit 61 by means of a transformer 62 having a secondary winding 62*a*. The output from the oscillator 14 is fed to a frequency doubler 65 and then optionally to a phase shift network 66 and is then delivered to a transformer 67 having a secondary 67*a* connected to the other pair of terminals of the rectifier network 61 to provide a phase demodulator. The demodulated output is taken from taps on the secondary windings 62*a* and 67*a* and delivered to a signal amplifier 70 and then to an output device such as loudspeaker 71.

Figure 5:
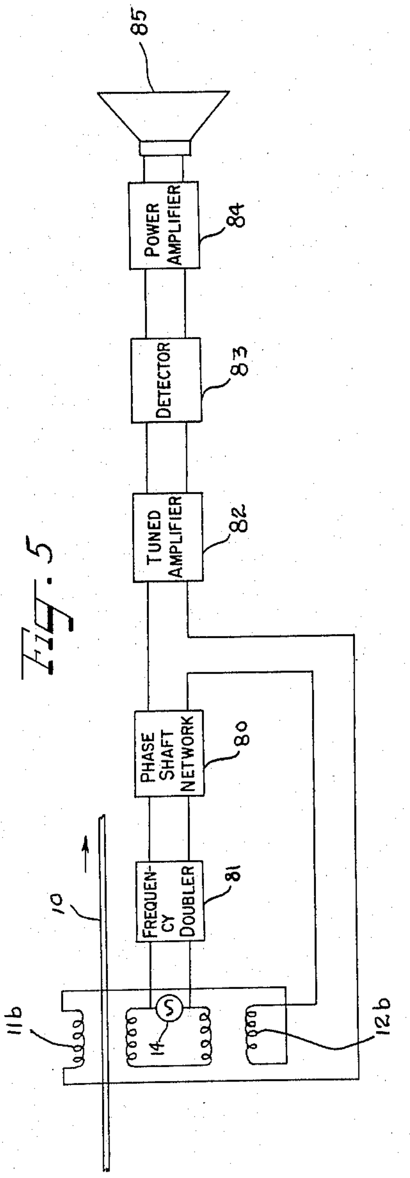
Figure 5 is a diagrammatic view of an alternative output circuit for the head of Figures 1 and 2.

Figure 5 illustrates a different method of demodulating the output from the head of Figure 2 wherein the output from the pick-up windings 11*b* and 12*b* in series is added to the output of a phase shifter network 80 which is supplied by means of a frequency doubler 81 connected to the oscillator 14. The resultant modulated output is delivered to a tuned amplifier 82 tuned to the second harmonic of the frequency of the oscillator 14 and then to a detector such as a simple diode detector 83, a power amplifier 84 and an output device such as a loud speaker 85.

Figure 6:
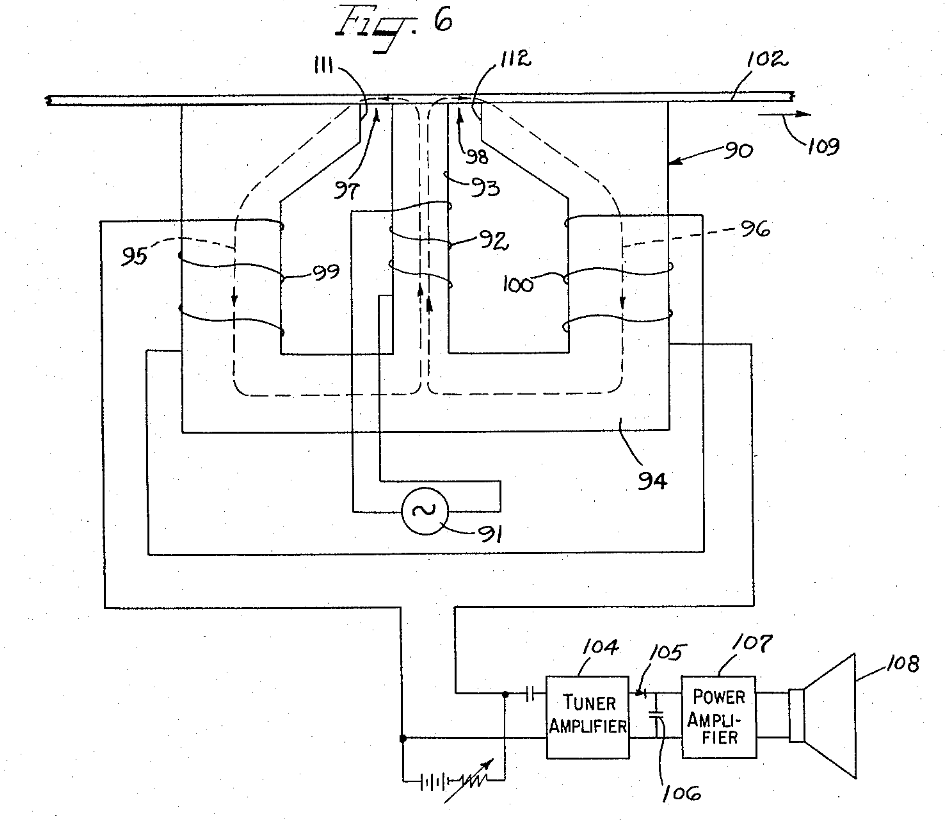
Figure 6 represents a still further embodiment of the present invention for sensing the internal magnetization of a record medium.

Figure 6 illustrates a head 90 for operating on a harmonic of the excitation frequency of the oscillator 91. In this instance, an exciting winding 92 is wound on the center leg 93 of E-shaped core 94 to provide oppositely directed exciting fluxes 95 and 96 at the gaps 97 and 98. The frequency of the exciting fluxes is preferably higher than the highest recorded frequency on the record member. The core 94 may be of a material having a relatively linear B—H characteristic. A second harmonic output signal is induced in windings 99 and 100 by the exciting fluxes 95 and 96 which varies in accordance with the recorded signal on the portion of the record medium 102 threaded by the exciting fluxes. The output windings 99 and 100 are connected with an amplifier 104 tuned to the second harmonic of the excitation frequency. The output from the amplifier is delivered to a simple rectifier 105 in series with a capacitance 106 and a power amplifier 107 is connected across the capacitance 106 to deliver the output to a suitable device such as loud speaker 108.

The width of the center leg in the direction of travel of the record member indicated by arrow 109 may be equal to the width of the gaps 97 and 98, and the recorded wave lengths are preferably long in comparison to the separation between poles 111 and 112 provided by the outer legs of core 94. The voltages induced in the output windings 99 and 100 by the exciting fluxes 95 and 96 are opposing so that the fundamental frequency component is balanced out, and only a second harmonic signal appears at the tuned amplifier 104. The oscillator coil 92 may be split with part placed on each of the outer legs or base legs of the core 94, so long as the desired balanced of the excitation frequency with respect to the signal windings 99 and 100 is maintained. The signal windings also may be placed on the base legs of the core.

The present application is a continuation-in-part of my copending application Serial No. 492,013 filed March 3, 1955.

It will be apparent that many further modifications and variations may be effected without departing from the scope of the novel concepts of the present invention.

I claim as my invention:

1. A magnetic playback head comprising an exciting winding for establishing a fluctuating exciting flux along a predetermined flux path, said path being disposed to intersect the path of travel of a magnetic record medium, means whereby said path has a substantially linear B—H characteristic over the range of values of magnetic flux to which said path is subjected, and a pick-up winding linking said flux path for inducing a voltage therein dependent upon the incremental permeability of the record medium.

2. A magnetic playback head comprising an exciting winding for establishing a fluctuating exciting flux along a predetermined flux path, said path being disposed to intersect the path of travel of a magnetic record medium, a pick-up winding linking said flux path for inducing a voltage therein dependent upon the incremental permeability of the record medium, and means whereby said flux path is in air except for said record medium.

3. A magnetic playback head comprising an exciting winding for establishing a fluctuating exciting flux along a predetermined flux path, said path being disposed to intersect the path of travel of a magnetic record medium, and means comprising a pick-up winding linking said flux path for inducing a voltage therein dependent upon the incremental permeability of the record medium, said exciting flux being of magnitude less than the coercive force of the record medium.

4. A magnetic playback head comprising an exciting winding for establishing a fluctuating exciting flux along a predetermined flux path, said path being disposed to intersect the path of travel of a magnetic record medium, means comprising a pick-up winding linking said flux path for inducing a voltage therein principally dependent upon the incremental permeability of the record medium, and means for balancing out the fundamental frequency component of voltage induced in said pick-up winding due to said exciting flux.

5. A magnetic head comprising an E-shaped core having closely spaced non-magnetic gaps, excitor means for establishing oppositely directed rapidly fluctuating exciting fluxes at the respective gaps, and output inductor means including portions each coupled to the flux path including one of the gaps and displaced from the flux path including the other of said gaps, said portions being connected to induce opposed voltages upon energization of said excitor means, and said flux path having a substantially linear B—H characteristic.

6. A magnetic transducer head comprising means for establishing a fluctuating exciting flux along a predetermined flux path, said path being disposed to intersect the path of travel of a magnetic record medium, output means coupled to said flux path for producing an electrical output, means whereby said output means in conjunction with said flux path is substantially insensitive to external leakage flux produced by the internal magnetization of said record medium to provide an output from said output means substantially independent of said external leakage flux, and means whereby said output means in conjunction with said flux path is directly responsive to the internal magnetization of said record medium to cause said output to vary substantially directly with the internal magnetization of the record medium and to be substantially independent of the external leakage flux produced by said internal magnetization.

7. A magnetic transducer head comprising means for establishing a fluctuating exciting flux along a predetermined flux path, said path being disposed to intersect the path of a magnetic record medium, means whereby said path has a substantially linear B—H characteristic over the range of values of magnetic flux to which said path is subjected, output means coupled to said flux path for producing an electrical output, means whereby said output means in conjunction with said flux path is substantially insensitive to external leakage flux produced by the internal magnetization of said record medium, and means whereby said output means in conjunction with said flux path is directly responsive to the internal magnetization of said record medium.

References Cited in the file of this patent

UNITED STATES PATENTS

| | | |
|---|---|---|
| 900,304 | Pedersen | Oct. 6, 1908 |
| 2,608,621 | Peterson | Aug. 26, 1952 |
| 2,675,429 | Rohling | Apr. 13, 1954 |
| 2,722,569 | Loper | Nov. 1, 1955 |
| 2,804,506 | Schurch | Aug. 27, 1957 |

OTHER REFERENCES

EDVAC Progress Report #2, June 30, 1946, pages 4–22, 4–23, PY–O–164, PY–O–165.